(12) United States Patent
Wu et al.

(10) Patent No.: US 10,460,762 B1
(45) Date of Patent: Oct. 29, 2019

(54) CANCELLING ADJACENT TRACK INTERFERENCE SIGNAL WITH DIFFERENT DATA RATE

(71) Applicant: Seagate Technology LLC, Cupertino, CA (US)

(72) Inventors: Zheng Wu, San Jose, CA (US); Jason Bellorado, San Jose, CA (US); Marcus Marrow, San Jose, CA (US); Vincent Brendan Ashe, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/121,296

(22) Filed: Sep. 4, 2018

(51) Int. Cl.
| | | |
|---|---|---|
| *G11B 20/24* | (2006.01) | |
| *G11B 5/012* | (2006.01) | |
| *G11B 5/035* | (2006.01) | |
| *G11B 20/10* | (2006.01) | |
| *G11B 5/54* | (2006.01) | |

(52) U.S. Cl.
CPC .............. *G11B 20/24* (2013.01); *G11B 5/012* (2013.01); *G11B 5/035* (2013.01); *G11B 5/54* (2013.01); *G11B 20/10046* (2013.01)

(58) Field of Classification Search
USPC ........ 360/39, 31, 27, 29, 45, 48, 51, 53, 55, 360/65, 75
See application file for complete search history.

(56) References Cited

U.S. PATENT DOCUMENTS

| | | | |
|---|---|---|---|
| 4,984,101 A | * | 1/1991 | Kanota .............. G11B 5/00878 360/65 |
| 5,321,564 A | | 6/1994 | Takahashi |
| 5,543,978 A | | 8/1996 | Park |
| 5,654,765 A | | 8/1997 | Kim |
| 5,742,532 A | | 4/1998 | Duyne et al. |
| 5,970,093 A | | 10/1999 | Lantremange |
| 6,157,510 A | | 12/2000 | Schreck et al. |
| 6,222,592 B1 | | 4/2001 | Patel |
| 6,320,920 B1 | | 11/2001 | Beyke |
| 6,377,552 B1 | | 4/2002 | Moran et al. |
| 6,505,222 B1 | | 1/2003 | Davis et al. |
| 6,580,676 B1 | | 6/2003 | Yanagisawa et al. |
| 6,633,894 B1 | | 10/2003 | Cole |
| 6,665,308 B1 | | 12/2003 | Rakib et al. |
| 6,687,073 B1 | | 2/2004 | Kupferman |
| 6,697,891 B2 | | 2/2004 | Emberty et al. |
| 6,707,772 B1 | | 3/2004 | Marrec et al. |
| 6,738,205 B1 | | 5/2004 | Moran et al. |
| 6,738,215 B2 | | 5/2004 | Yatsu |

(Continued)

*Primary Examiner* — Tan X Dinh
(74) *Attorney, Agent, or Firm* — Setter Roche LLP; Kirk A. Cesari

(57) ABSTRACT

An apparatus may comprise a circuit configured to receive first underlying data corresponding to a first signal with a first rate and receive a second signal with a second rate corresponding to second underlying data. The circuit may interpolate the first underlying data to generate a plurality of interpolated signals, determine, for the first signal, a first channel pulse response shape with the first rate, and determine an interference component signal based on the plurality of interpolated signals and the first channel pulse response shape. The circuit may then cancel interference in the second signal using the interference component signal to generate a cleaned signal.

20 Claims, 7 Drawing Sheets

(56) References Cited

U.S. PATENT DOCUMENTS

| | | |
|---|---|---|
| 6,950,258 B2 | 9/2005 | Takaishi |
| 6,993,291 B2 | 1/2006 | Parssinen et al. |
| 7,046,701 B2 | 5/2006 | Mohseni et al. |
| 7,133,233 B1 | 11/2006 | Ray et al. |
| 7,245,448 B2 | 7/2007 | Urata |
| 7,298,573 B2 | 11/2007 | Kitamura |
| 7,324,437 B1 | 1/2008 | Czylwik et al. |
| 7,362,432 B2 | 4/2008 | Roth |
| 7,929,238 B1 | 4/2011 | Vasquez |
| 7,940,667 B1 | 5/2011 | Coady et al. |
| 7,948,703 B1 | 5/2011 | Yang |
| 8,139,301 B1 | 3/2012 | Li et al. |
| 8,172,755 B2 | 5/2012 | Song et al. |
| 8,400,726 B1 | 3/2013 | Wu et al. |
| 8,456,977 B2 | 6/2013 | Honma |
| 8,479,086 B2 | 7/2013 | Xia et al. |
| 8,514,506 B1 | 8/2013 | Li et al. |
| 8,539,328 B2 | 9/2013 | Jin et al. |
| 8,542,766 B2 | 9/2013 | Chekhovstov et al. |
| 8,713,413 B1 | 4/2014 | Bellorado et al. |
| 8,724,245 B1 | 5/2014 | Smith et al. |
| 8,767,341 B1 | 7/2014 | Coker et al. |
| 8,780,477 B1 | 7/2014 | Guo et al. |
| 8,837,068 B1 | 9/2014 | Liao et al. |
| 8,861,111 B1 | 10/2014 | Liao et al. |
| 8,861,112 B1 | 10/2014 | Pan et al. |
| 8,953,276 B1 | 2/2015 | Pokharel et al. |
| 9,007,707 B1 | 4/2015 | Lu et al. |
| 9,019,642 B1 | 4/2015 | Xia et al. |
| 9,025,269 B1 | 5/2015 | Wong et al. |
| 9,064,537 B1 | 6/2015 | Nie et al. |
| 9,082,418 B2 | 7/2015 | Ong et al. |
| 9,093,115 B1 | 7/2015 | Fung et al. |
| 9,099,132 B1 | 8/2015 | Grundvig et al. |
| 9,129,650 B2 | 9/2015 | Mathew et al. |
| 9,147,416 B2 | 9/2015 | Grundvig et al. |
| 9,196,298 B1 | 11/2015 | Zhang et al. |
| 9,245,579 B2 | 1/2016 | Song et al. |
| 9,245,580 B1 | 1/2016 | Lu et al. |
| 9,257,135 B2 | 2/2016 | Ong et al. |
| 9,286,915 B1 | 3/2016 | Dziak et al. |
| 9,311,937 B2 | 4/2016 | Zou et al. |
| 9,401,161 B1 | 7/2016 | Jury et al. |
| 9,424,878 B1 | 8/2016 | Dziak et al. |
| 9,431,052 B2 | 8/2016 | Oberg et al. |
| 9,508,369 B2 | 11/2016 | Chu et al. |
| 9,542,972 B1 | 1/2017 | Nayak et al. |
| 9,564,157 B1 | 2/2017 | Trantham |
| 9,590,803 B2 | 3/2017 | Derras et al. |
| 9,672,850 B2 | 6/2017 | Grundvig et al. |
| 9,728,221 B2 | 8/2017 | Oberg et al. |
| 9,947,362 B1 | 4/2018 | Venkataramani et al. |
| 10,177,771 B1 * | 1/2019 | Bellorado ............ H03K 5/135 360/65 |
| 10,276,197 B2 * | 4/2019 | Bellorado ............ H03K 5/135 360/65 |
| 10,297,281 B1 * | 5/2019 | Bellorado ............ G11B 19/20 360/65 |
| 2002/0181439 A1 | 12/2002 | Orihashi et al. |
| 2003/0198165 A1 | 10/2003 | Mouri et al. |
| 2004/0228397 A1 | 11/2004 | Bach |
| 2005/0117243 A1 | 6/2005 | Serizawa |
| 2007/0139805 A1 | 6/2007 | Mead |
| 2007/0139806 A1 | 6/2007 | Southerland et al. |
| 2007/0177292 A1 | 8/2007 | Bui et al. |
| 2008/0158711 A1 | 7/2008 | Bliss et al. |
| 2008/0175309 A1 | 7/2008 | Fimoff et al. |
| 2009/0141386 A1 | 6/2009 | Miura |
| 2009/0323214 A1 | 12/2009 | Grundvig et al. |
| 2010/0290153 A1 | 11/2010 | Hampshire |
| 2011/0002375 A1 | 1/2011 | Honma |
| 2011/0090773 A1 | 4/2011 | Yu et al. |
| 2011/0176400 A1 | 7/2011 | Gerasimov |
| 2012/0105994 A1 | 5/2012 | Bellorado et al. |
| 2012/0155577 A1 | 6/2012 | Shukla et al. |
| 2013/0076433 A1 | 3/2013 | Fratti |
| 2015/0003221 A1 | 1/2015 | Sankaranarayanan et al. |
| 2015/0279398 A1 | 10/2015 | Fan et al. |
| 2016/0112218 A1 | 4/2016 | Abe |
| 2017/0249206 A1 | 8/2017 | Jeong et al. |
| 2018/0062623 A1 * | 3/2018 | Pagnanelli ............ H03M 3/414 360/65 |

\* cited by examiner

CANCELLING ADJACENT TRACK INTERFERENCE SIGNAL WITH DIFFERENT DATA RATE

SUMMARY

In certain embodiments, an apparatus may comprise a circuit configured to receive first underlying data corresponding to a first signal with a first rate and receive a second signal with a second rate corresponding to second underlying data. The circuit may interpolate the first underlying data to generate a plurality of interpolated signals, determine, for the first signal, a first channel pulse response shape with the first rate, and determine an interference component signal based on the plurality of interpolated signals and the first channel pulse response shape. The circuit may then cancel interference in the second signal using the interference component signal to generate a cleaned signal.

In certain embodiments, a system may comprise a cancellation circuit configured to receive first underlying data corresponding to a first signal with a first rate, interpolate the first underlying data to generate a plurality of interpolated signals, determine, for the first signal, a first channel pulse response shape with the first rate, and determine an interference component signal based on the plurality of interpolated signals and the first channel pulse response shape. The system may further include an adder configured to receive a second signal with a second rate corresponding to second underlying data and cancel interference in the second signal using the interference component signal to generate a cleaned signal.

In certain embodiments, a method may comprise receiving first underlying data corresponding to a first signal with a first rate and interpolating, by an interpolation circuit, the first underlying data to generate a plurality of interpolated signals using a plurality of respective interpolation coefficients stored in a look up table. The method may further comprise determining, by a channel pulse response shape circuit, for the first signal, a first channel pulse response shape with the first rate and determining, by the channel pulse response shape circuit, an interference component signal based on the plurality of interpolated signals and the first channel pulse response shape. In addition, the method may comprise receiving, a second signal with a second rate corresponding to second underlying data and canceling interference in the second signal using the interference component signal to generate a cleaned signal.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software or firmware programs running on a computer processor or controller. In accordance with another embodiment, the methods and functions described herein may be implemented as one or more software or firmware programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

The present disclosure generally relates to cancellation of interference between signals, and more specifically, the present disclosure relates to interference between signals with different bit rates. Some systems, such as electrical, electronic, motor drive, processing, or other systems may receive a signal of interest that include interference from another signal with a bit rate that is different from the signal of interest. The received signal of interest and the signal that is the source of the interference can be processed to produce a cleaned signal that can be provided to a detector for detection of bit values of a bit sequence corresponding to data underlying the signal of interest.

For example, the underlying data embodied by a signal that is the source of the interference may be utilized to generate a channel pulse response shape with the sampling rate or bit rate of the signal that is the source of the interference. The channel pulse response shape and the underlying data embodied by the signal may be used to approximate the portion of the signal of interest which is the result of the interference. The approximated portion may then be removed from the signal of interest to generate a cleaned signal.

Figure 1:
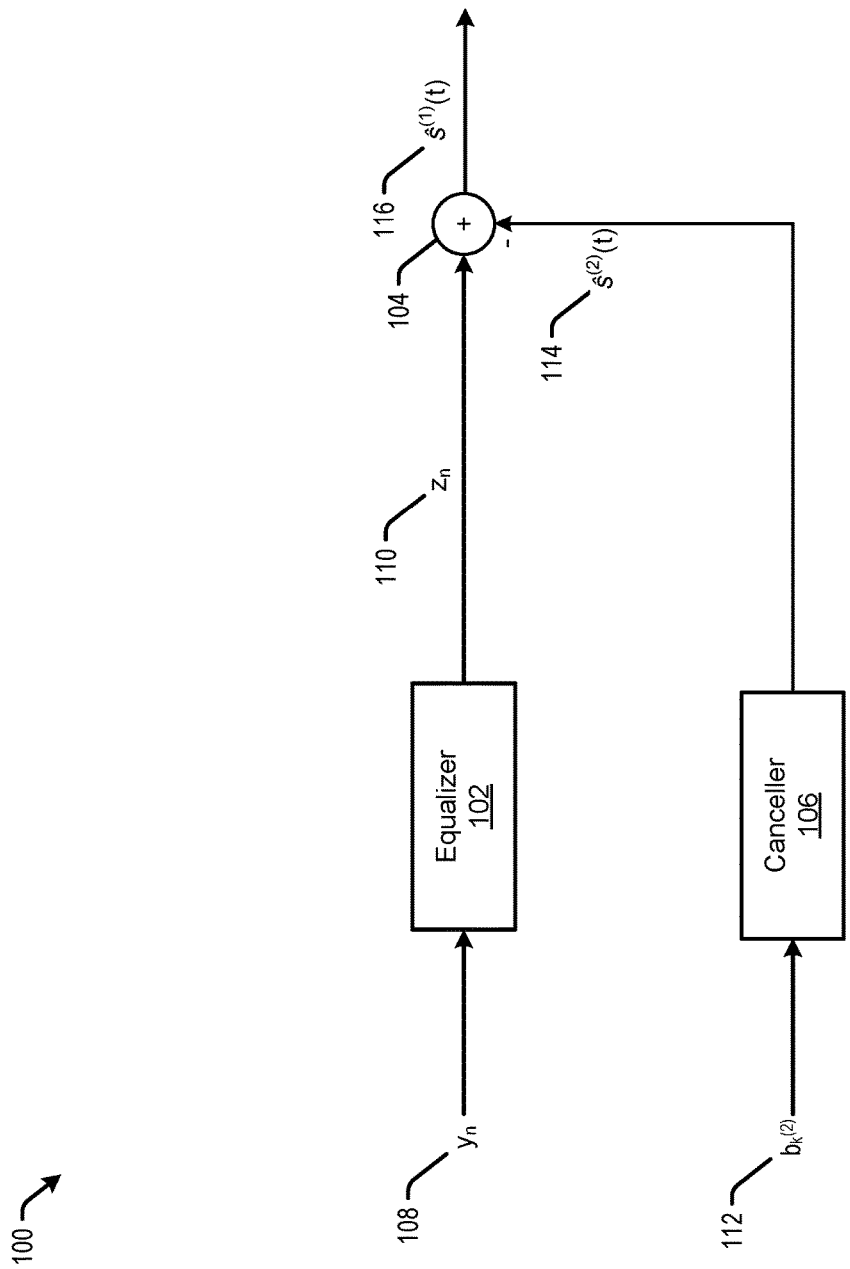
FIG. 1 is a block diagram of a system of asynchronous interference cancellation, in accordance with certain embodiments of the present disclosure.

Referring to FIG. 1, a block diagram of a system of asynchronous interference cancellation is shown and is generally designated 100. The system 100 can be configured to produce a cleaned signal by canceling interference in a signal of interest that results from another signal that may be asynchronous with the signal of interest. It can include an equalizer 102 that may be coupled to an adder 104. The system 100 may further include a canceller 106 which may be coupled to the adder 104.

The equalizer 102 may receive a signal of interest 108 ($y_n$) from which interference is to be cancelled. In some examples, the signal of interest 108 ($y_n$) may be a sequence of digital samples, for example, generated by an analog-to-digital converter (ADC) from a continuous time input signal. The equalizer 102 may generate an equalized signal 110 ($z_n$) based on the signal 108.

The canceller 106 may receive underlying data corresponding to an adjacent signal 112 ($b_k^{(2)}$) which can be, for various reasons, the source of the interference in the signal 108. The underlying data in the signal 110 and adjacent signal 112 may both be bit sequences. The adjacent signal 112 may have a different bit rate from the signal 110. The canceller 106 may generate an interference component signal 114 ($\hat{s}^{(2)}(t)$) which may be an estimate of the interference from the adjacent signal 112 that is present in the signal 108.

The adder 104 may receive the equalized signal 110 and the interference component signal 114. The adder 104 may combine the equalized signal 110 and the interference component signal 114 (e.g. subtract the interference component signal 114 from the equalized signal 110) such that the estimated interference 114 is removed from the equalized signal 110. In this way, the adder 104 may generate the cleaned signal 116 ($\hat{s}^{(1)}(t)$).

Each of the equalizer 102, adder 104, and canceller 106 may be a separate circuit, a system on chip (SOC), firmware, a processor(s), or other system not listed, or any combination thereof.

The following discussion provides an example of the operation of the canceller 106.

In the following example, which may be used in magnetic recording, the bits of the signal 110 (e.g. a center track or track of interest) may have a frequency of $f_1$ and a corresponding period of $T_1$ and the bits of the adjacent signal 112 (e.g. an adjacent track or side track) may have a frequency of $f_2$ and a corresponding period of $T_2$. The read back signal from center track can be written as:

$$z(t) = s^{(1)}(t) + s^{(2)}(t) + N(t)$$

where $s^{(1)}(t)$ may be the center track signal, $s^{(2)}(t)$ may be the side track interfering signal and $N(t)$ may be the noise.

The read back signal may be sampled at the center track frequency $f_1$ when reading back the center track sectors. The digitized signal (with index n) may be written as:

$$z(nT_1) = s^{(1)}(nT_1) + s^{(2)}(nT_1) + N(nT_1)$$

In some embodiments, the signal $z(nT_1)$ may be the output of a filter of an input read back signal in a read channel system (e.g. the equalized signal 110 ($z_n$)).

Some embodiments may estimate the interfering signal using a pulse response shape of the side track signal. For example, the continuous time pulse response shape may be represented by $h^{(2)}(t)$ and the estimated interfering signal (continuous time) may be written as:

$$\hat{s}^{(2)}(t) = \sum_k b_k^{(2)} h^{(2)}(t - kT_2)$$

where $b_k^{(2)}$ may be the underlying the side track written data or decoded data for a continuous time read signal for the side track.

The continuous time side track pulse response shape may be interpolated from the values at particular sampling points using the sampling rate $f_2$, e.g:

$$h^{(2)}(t) = \sum_i C(t - iT_2) h^{(2)}(iT_2)$$

When t goes to positive and negative infinity, the pulse response shape may go to zero. As such, some embodiments may determine the pulse response shape for a finite length, for example, 2L+1. In such a case, the pulse response shape may be determined as:

$$h^{(2)}(t) = \sum_{i=-L}^{L} C(t - iT_2) h^{(2)}(iT_2)$$

In turn, the estimated interference signal may be written as:

$$\hat{s}^{(2)}(t) = \sum_k b_k^{(2)} \sum_{i=-L}^{L} C(t - kT_2 - iT_2) h^{(2)}(iT_2)$$

Herein, $h_i^{(2)} = h^{(2)}(iT_2)$. By switching the summation order of i and k in the above equation, and evaluating the estimated signal at sampling points of center track signals, the estimated interference may be written as:

$$\hat{s}^{(2)}(nT_1) = \sum_{i=-L}^{L} \sum_k b_k^{(2)} C(nT_1 - kT_2 - iT_2) h^{(2)}(iT_2)$$

Herein, $d(n,i)$ may be defined as $d(n,i) = \sum_k b_k^{(2)} C(nT_1 - kT_2 - iT_2)$. As such, the estimated side track signal may be written as:

$$\hat{s}^{(2)}(nT_1) = \sum_{i=-L}^{L} d(n,i) h^{(2)}(iT_2)$$

In cases where $T_1 \neq T_2$, the signal $d(n,i)$ may not be expressible as a function of n−i. Therefore, $d(n,i)$ may need to be computed for all i at time n.

To compute $d(n,i)$, some embodiments may utilize the expression:

$$nT_1 - kT_2 - iT_2 = \left(\frac{nT_1}{T_2} - k - i\right) T_2 = (m + \phi_n) T_2$$

where $\phi_n$ is a fractional part of the phase (smaller than 1) at time n. As such, $$d(n,i) = \sum_m b_{\left\lfloor \frac{nT_1}{T_2} \right\rfloor - m - i}^{(2)} C_I(m + \phi_n)$$

where $C_I$ may be coefficients for an interpolation filter. The interpolation filter taps $C_I(j)$ may decay to zero when j goes to positive and negative infinity. As such, some embodiments may use a fixed length interpolation filter. In some embodiments, the coefficients may be stored in a look-uptable (LUT) for different $\phi$. The input to the LUT may be the phase $\phi_n$, which may be within the range of [0,1]. An accumulator for phase may track both the movement of the integer portion of $nT_1/T_2$ and the fractional portion $\phi_n$.

In the above equation, for different n, the coefficients of the interpolation filter may be different. As such, in some embodiments, the system may include a structure or functionality to generate the streams $\{d(n,i)\}$, $i=-L, \ldots, L$. Such an example structure is shown in FIG. 2.

Figure 2:
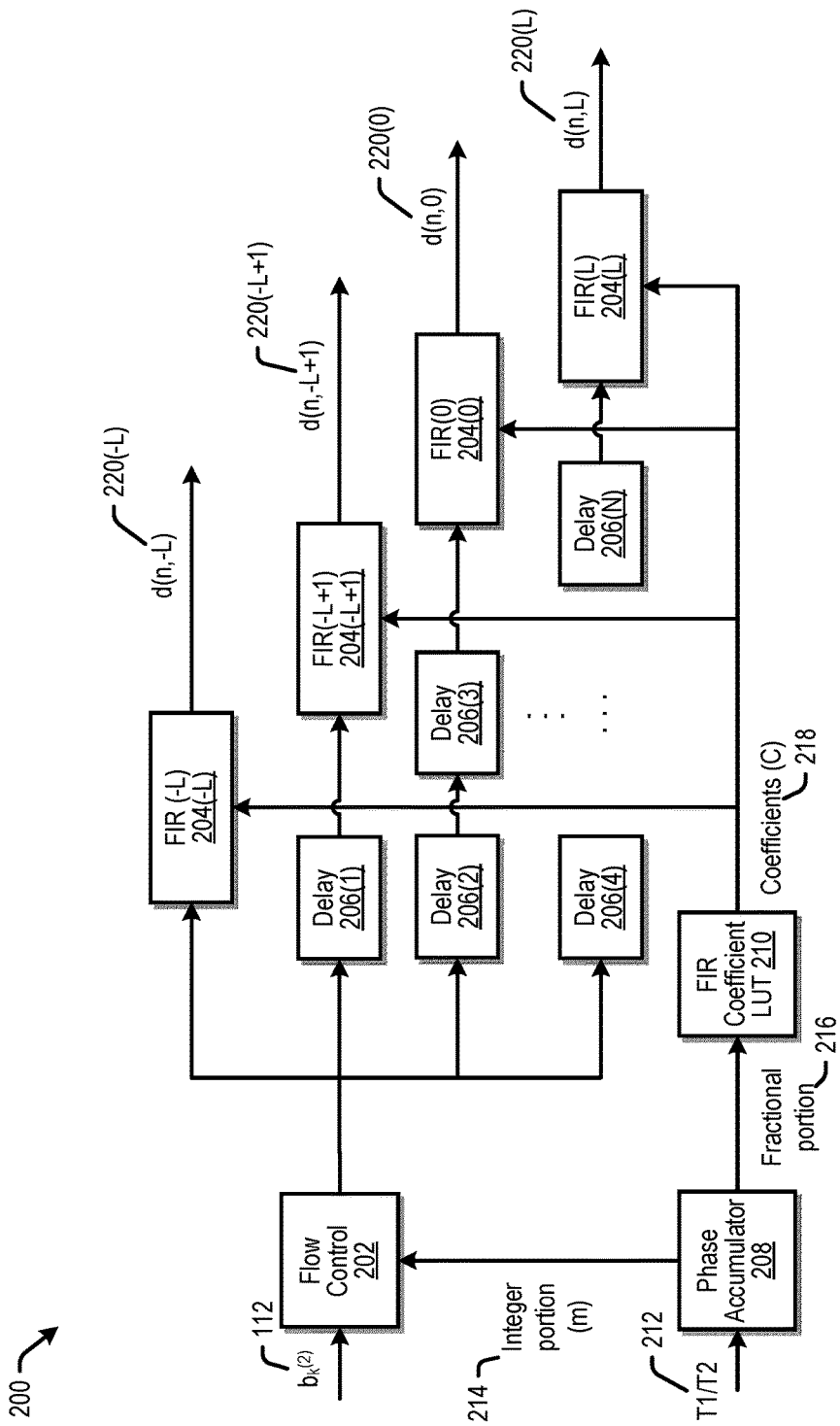
FIG. 2 is a block diagram of a system of asynchronous interference cancellation, in accordance with certain embodiments of the present disclosure.

Referring to FIG. 2, a block diagram of a system of asynchronous interference cancellation is shown and is generally designated 200. The system 200 can be configured to produce the streams $\{d(n,i)\}$, $i=-L, \ldots, L$ discussed above. System 200 may include a flow control module 202 that may be coupled to an FIR(-L) 204(-L) and delay gates 206(1)-206(N) which may be coupled in delay chains to FIR(-L+1) 204(-L+1) to FIR(L) 204(L). The system 200 may further include a phase accumulator 208 which may be coupled to the flow control module 202 and a FIR coefficient lookup table (LUT) 210. In turn, the FIR coefficient LUT 210 may be coupled to FIR(-L) 204(-L) to FIR(L) 204(L).

Each of the flow control module 202, FIR(-L) 204(-L) to FIR(L) 204(L), delay gates 206(1)-206(N), phase accumulator 208, and FIR coefficient LUT 210 may be a separate circuit, a system on chip (SOC), firmware, a processor(s), or other system not listed, or any combination thereof.

In operation, the phase accumulator 208 may determine $nT_1/T_2$ 212 where n is increasing. The integer portion (m) 214 of $nT_1/T_2$ 212 may be output to the flow control module 202. Further, the fractional portion 216 of $nT_1/T_2$ 212 may be output to the FIR coefficient LUT 210.

The flow control module 202 may receive the underlying data corresponding to the adjacent signal 112 ($b_k^{(2)}$). Based on the integer portion 214 of $nT_1/T_2$ 212, the flow control module 202 may provide $b_k^{(2)}$ 112 to the FIR(-L) 204(-L) and FIR(-L+1) 204(-L+1) to FIR(L) 204(L) via delay lines 206(1) to delay lines 206(N). As shown in the equation above, for different FIR 204, the delay of the input may be different.

In some examples, the flow control module 202 may determine which bits of the $b_k^{(2)}$ stream 112 to provide to the FIRs 204. For example, when $T_1/T_2=0.8$, the accumulation of $nT_1/T_2$ may be 0, 0.8, 1.6, 2.4, 3.2, 4.0, 4.8, 5.6 and so on. Based on this, the integer portion of the accumulation of $nT_1/T_2$ may be 0, 0, 1, 2, 3, 4, 4, 5. As such, the flow control module may not need to fetch and provide a new bit from the $b_k^{(2)}$ stream 112 to the FIRs 204 every cycle. For example, the second indexes of 0 and 4 in the sequence (e.g. the second and seventh integers in the sequence of the accumulation of $nT_1/T_2$ above).

On the other hand, when $T_1/T_2>1$, for example, $T_1/T_2=1.2$, the accumulation of $nT_1/T_2$ may be 0, 1.2, 2.4, 3.6, 4.8, 6, 7.2, 8.4, 9.6, and so on. Based on this, the integer portion may be 0, 1, 2, 3, 4, 6, 7, 8, 9, and so on. As listed, the integer portion may jump, here, from 4 to 6. In such a scenario, the flow control module may fetch and provide two bits from the $b_k^{(2)}$ stream 112 to the FIRs 204 during this cycle.

However, some embodiments may utilize various other arrangements in place of or in addition to the flow control module. For example, a control signal may be used at the reader, input or source of the $b_k^{(2)}$ stream 112 and a write control signal may be used at the output of the FIRs to perform a similar function to the flow control module. For example, the input control signal may skip a bit of the $b_k^{(2)}$ stream 112 from time to time when $T_1/T_2<1$, while the output may skip an output bit from the FIRs 204 (e.g. while the input may still be shifted into the FIRs 204) from time to time when $T_1/T_2>1$.

The FIR coefficient LUT 210 may utilize the fractional portion of $nT_1/T_2$ 212 to determine the FIR coefficients (C) 218, for example, for each of FIR(-L) 204(-L) to FIR(L) 204(L). The FIR coefficients (C) 218 may be determined for various phases (e.g. fractional portions), regions, sets of tracks or signals at the time of manufacture or during operation and stored in the FIR coefficients LUT 210.

In some embodiments, each of FIR(-L) 204(-L) to FIR (L) 204(L) may generate a stream d(n,i) (e.g. d(n,-L) 220(-L) to d(n, L) 220(L)). For example, d(n,-L) 220(-L) to d(n, L) 220(L) may be determined based on the equation above from the underlying data corresponding to the adjacent signal 112 ($b_k^{(2)}$) and the FIR coefficients (C) 218.

Figure 3:
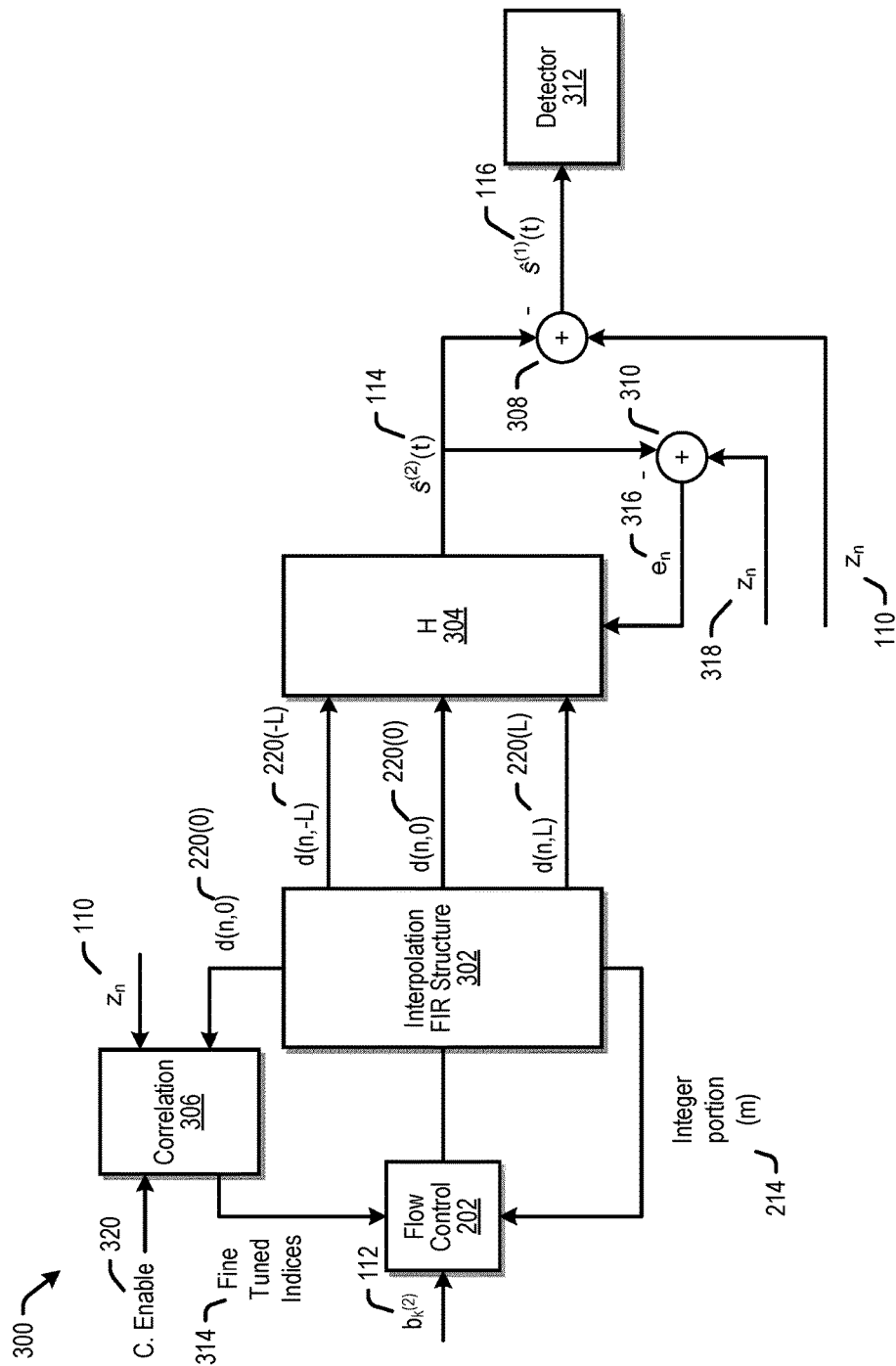
FIG. 3 is a block diagram of a system of asynchronous interference cancellation, in accordance with certain embodiments of the present disclosure.

Referring to FIG. 3, a block diagram of a system of asynchronous interference cancellation is shown and is generally designated 200. The system 300 may be configured to utilize the structure of FIG. 2 to generate an interference component signal 114 ($\hat{s}^{(2)}(t)$) based on the streams $\{d(n,i)\}$, $i=-L, \ldots, L$.

As shown, system 300 may include the system 200. In particular, the system 300 may include the flow control module 202 which may be coupled to the interpolation FIR structure 302. The interpolation FIR structure 302 may include the FIR(-L) 204(-L) to FIR(L) 204(L), delay gates 206(1)-206(N), phase accumulator 208, and FIR coefficient LUT 210 as discussed above with respect to FIG. 2. The interpolation FIR structure 302 may be coupled to the flow control module 202, a channel pulse response shape module (H) 304 and a correlation module 306. The correlation module 306 may further be coupled to the flow control 202. The channel pulse response shape module (H) 304 may be coupled to the adders 308 and 310. In turn, the adder 310 may be coupled to the channel pulse response shape module (H) 304.

In operation, the flow control module 202 may generally operate as discussed above to receive the underlying data corresponding to the adjacent signal 112 ($b_k^{(2)}$). Based on the integer portion (m) 214 of T1/T2 212, the flow control module 202 may provide $b_k^{(2)}$ 112 to the interpolation FIR structure 302 (e.g. FIR(-L) 204(-L) to FIR(L) 204(L)). In addition to the inputs previously discussed, the flow control module 202 may further utilize fine-tuned indices 314 to align the adjacent signal and signal of interest at the integer scale.

As mentioned above, the interpolation FIR structure 302 may include the FIR(-L) 204(-L) to FIR(L) 204(L), delay gates 206(1)-206(N), phase accumulator 208, and FIR coefficient LUT 210 and these structures may operate as discussed above with respect to FIG. 2 to determine d(n,-L) 220(-L) to d(n, L) 220(L).

The correlation module 306 may operate to determine the fine-tuned indices 314 that may be used by the flow control module 202 to align the estimated adjacent signal and signal of interest (e.g. center track) at the integer scale. In particular, the side track data and the center track data may not be aligned at the integer scale at the beginning of the disclosed operation based solely on the integer portion (m).

The correlation module 306 may be regarded as performing a separate step before the general operations through the FIRs (204) other than the FIR(0) 204(0) and the adaptation of the channel pulse response shape module (H) 304. The correlation module 306 may utilize an interpolated sequence, for example, starting from a bit $b_0^{(2)}$, which may correlate to a read position a controller or firmware may estimate from an underlying media format (e.g. a format used by a magnetic storage media). The interpolated sequence may be correlated with the incoming signal $z_n$ 110. This correlation may generate fine-tuned indices 314 which may be utilized by the flow control module to refine a starting index in subsequent operation.

The correlation step may not be repeated in some embodiments. In particular, the correlation module 306 may receive a correlation enable signal 320 from the controller or firmware discussed above when the starting index is being determined. Subsequent to the adjustment of starting index, the correlation enable signal 320 may disable operation of module 306. In some embodiments, a dedicated duplicate of FIR(0) 204(0) may be included for the correlation module 306 rather than have d(n, 0) 220(0) supplied by the FIR(0) 204(0) in the interpolation FIR structure 302. In other embodiments, the interpolated sequences may be saved in a memory before the operations described herein. In such an embodiment, the correlation result may be utilized to fetch the sequence from the memory at a refined starting index.

In order to find a rough alignment (within $T_1$), some embodiments may correlate the center track signal and the side track resampled data (e.g., may correlate the sequence $\{z(nT_1), n=0, \ldots, N-1\}$ 110 with $\{d(j,0), j=0, \ldots, N-1\}$) to find out a peak. The correlation length N may be various sizes. The length of the sequence may encompass the whole sequence of, for example, a sector. However, in some embodiments, the length of the sequence may be shorter and determined according to complexity and peak detection trade off.

As mentioned above, in some embodiments, the correlation module 306 may utilize the stream d(n, 0) 220(0) to correlate with the center track read back signal $(nT_1)$ 110. A shift may be determined based on a correlation peak for the signals and output to the flow control module 202 as fine-tuned indices 314. More particularly, in FIG. 3, the fine-tuned indices 314 may be returned to the flow control module 202, which may result in $b_k^{(2)}$ being adjusted. For example, the determined shift may be used by the flow control module 202 to adjust the alignment of streams d(n,i) 220 to the center track signal (e.g. adjust the timing of d(n,i) 220 for the interpolation FIR structure 302). In some embodiments, instead of adjusting $b_k^{(2)}$, the adjustment can be made directly on d(n,i).

The channel pulse response shape module (H) 304 may operate to generate and apply a channel pulse response shape $h^{(2)}(iT_2)$ or $h_i^{(2)}$ to the streams d(n,i) 220 to generate the interference component signal 114 ($\hat{s}^{(2)}(t)$) based on the equation:

$$\hat{s}^{(2)}(nT_1) = \sum_{i=-L}^{L} d(n,i)h^{(2)}(iT_2)$$

The channel pulse response shape module (H) 304 may output the interference component signal 114 ($\hat{s}^{(2)}(t)$) to the adders 308 and 310.

The adder 308 may subtract the interference component signal 114 ($\hat{s}^{(2)}(t)$) from, for example, the equalized signal 110 ($z_n$) to generate the cleaned signal 116 ($\hat{s}^{(1)}(t)$). Similarly, the adder 310 may subtract the interference component signal 114 ($\hat{s}^{(2)}(t)$) from the a signal 318 which may be the equalized signal 110 ($z_n$) to generate an error signal $e_n$ 316.

The error signal $e_n$ 316 may be returned to the channel pulse response shape module (H) 304 for use in adaptation.

The adaptation of $h_i$ by may be implemented using a least mean square (LMS) method or other similar adaptation algorithm. Some embodiments using LMS adaptation may minimize the squared error as:

$$e^2(n) = (z(nT_1) - \hat{s}^{(2)}(nT_1))^2$$

In such embodiments, the gradient for adapting the tap $h_i^{(2)}$ may be written as:

$$\frac{\partial e^2(n)}{\partial h_i^{(2)}} = -2e \frac{\partial \hat{s}^{(2)}(nT_1)}{\partial h_i^{(2)}} = -2ed(n,i)$$

As such, the update equation for $h_i^{(2)}$ may be written as:

$$h_i^{(2)}(n+1) = h_i^{(2)}(n) + \mu ed(n,i), i=-L, \ldots, L$$

where $\mu$ is a step size control for adaptation.

In some embodiments, the adaptation of the pulse response shape $h_i^{(2)}$ may absorb any remaining fractional portion of $T_1$ of the delay between the side track data and the center track signal.

The detector 312 may operate to determine the underlying data corresponding to the center track signal based on the bit sequence represented by the samples of the cleaned signal 116.

Figure 4:
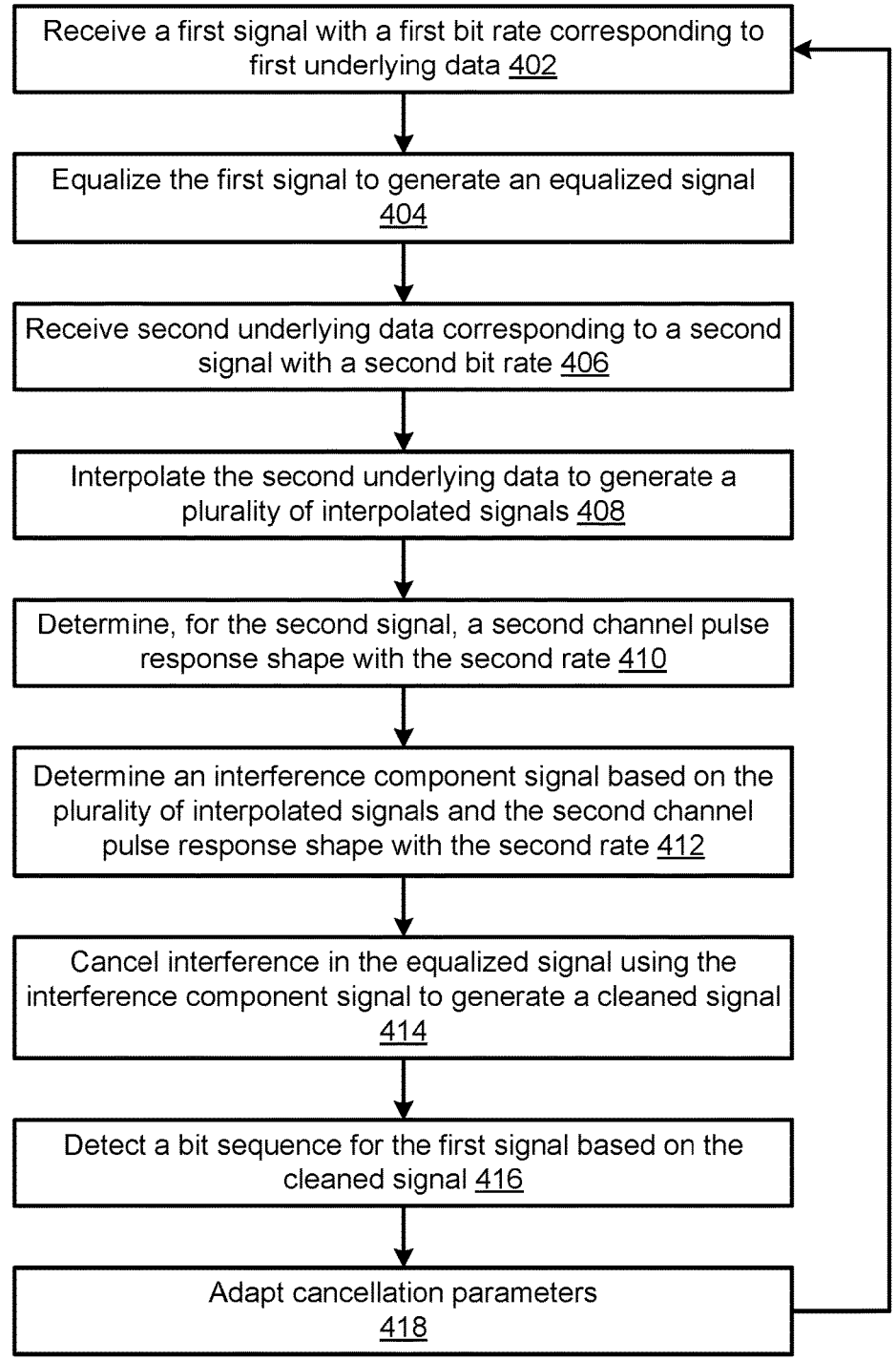
FIG. 4 is a flowchart of a method of asynchronous interference cancellation, in accordance with certain embodiments of the present disclosure.

Referring to FIG. 4, a flowchart of a method of asynchronous interference cancellation is shown and is generally designated 400. The method 400 can be an embodiment of the operations of systems 100-300. The order in which the operations are described is not intended to be construed as a limitation, and any number of the described operations can be combined in any order and/or in parallel to implement the process.

The system may receive a first signal with a first bit rate corresponding to first underlying data, at 402. The first signal may be equalized to generate an equalized signal, at 404. The system may receive second underlying data corresponding to a second signal with a second bit rate, at 406. The second underlying data may be interpolated at 408 to generate a plurality of interpolated signals. At 410, the system may determine, for the second signal, a second channel pulse response shape with the second rate. At 412, the system may determine an interference component signal based on the plurality of interpolated signals and the second channel pulse response shape with the second rate. The system may then cancel the interference in the equalized signal using the interference component signal to generate a cleaned signal, at 414. A bit sequence for the first signal may be detected based on the cleaned signal, at 416. At 418, the system may adapt cancellation parameters based on the interference component signal.

The process may repeat at 402. Additionally or alternatively, after block 414, blocks 406-414 may be repeated using the cleaned signal as the equalized signal and another adjacent signal as the second signal, for example, until all adjacent signals contributing interference to the signal 110 have been accounted for. This and other variations would be apparent to one of ordinary skill in the art in view of this specification.

All steps listed for the method 400 may be applied to communication systems that have adjacent signals or a second signal that allows for the error signal herein to be calculated. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 5:
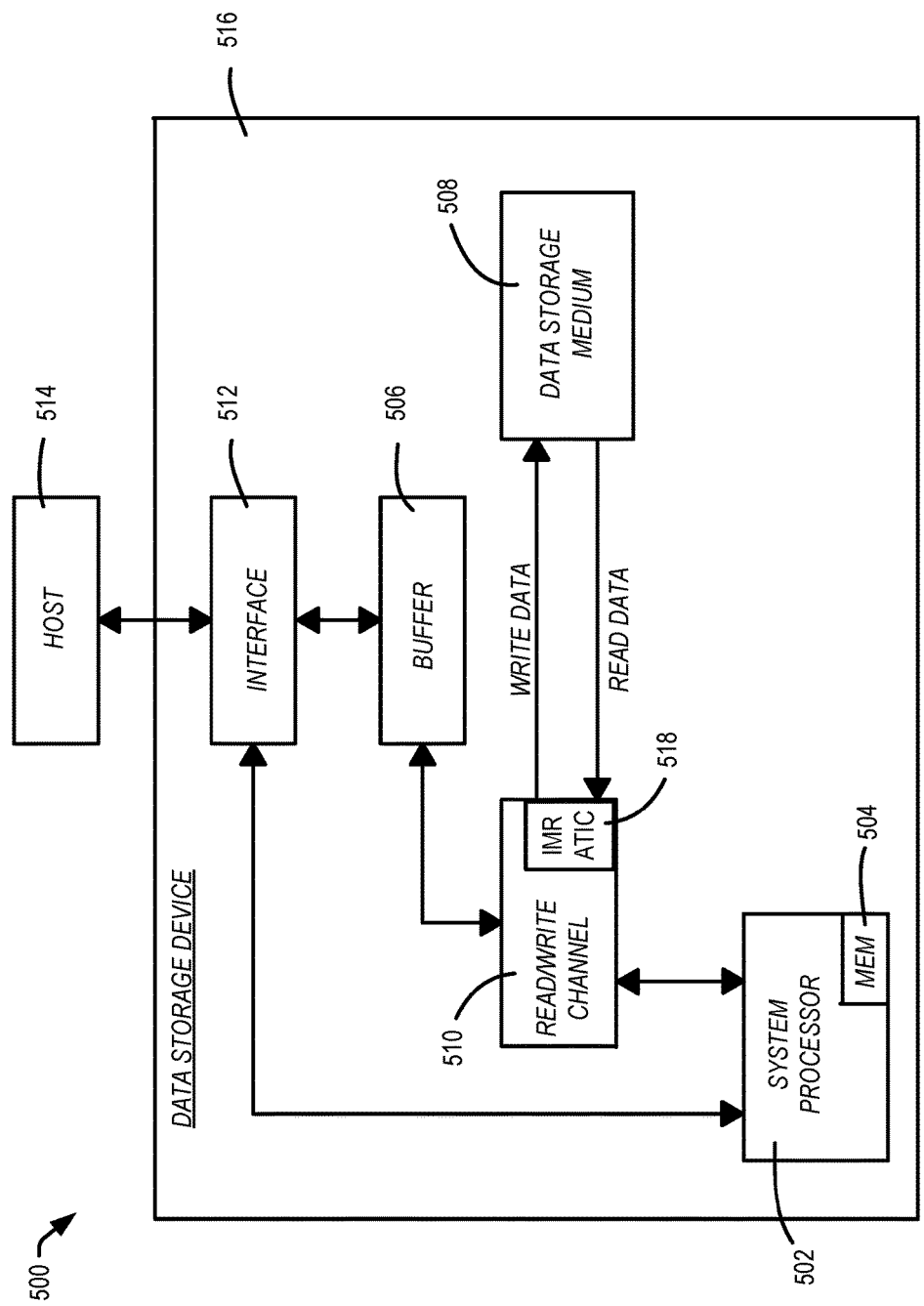
FIG. 5 is a block diagram of a system of asynchronous adjacent track interference cancellation, in accordance with certain embodiments of the present disclosure.
Figure 6:
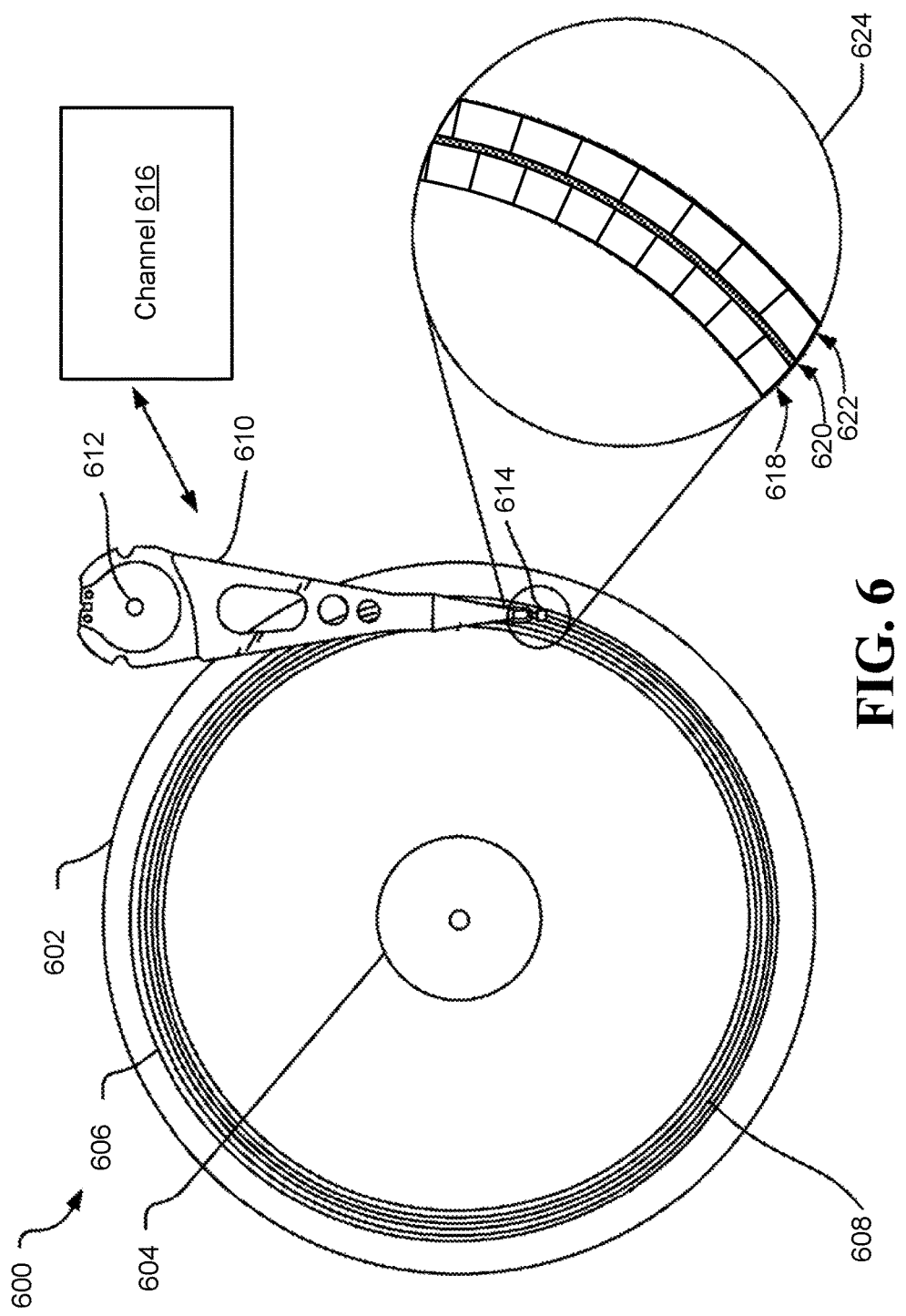
FIG. 6 is a block diagram of a system of asynchronous adjacent track interference cancellation, in accordance with certain embodiments of the present disclosure.
Figure 7:
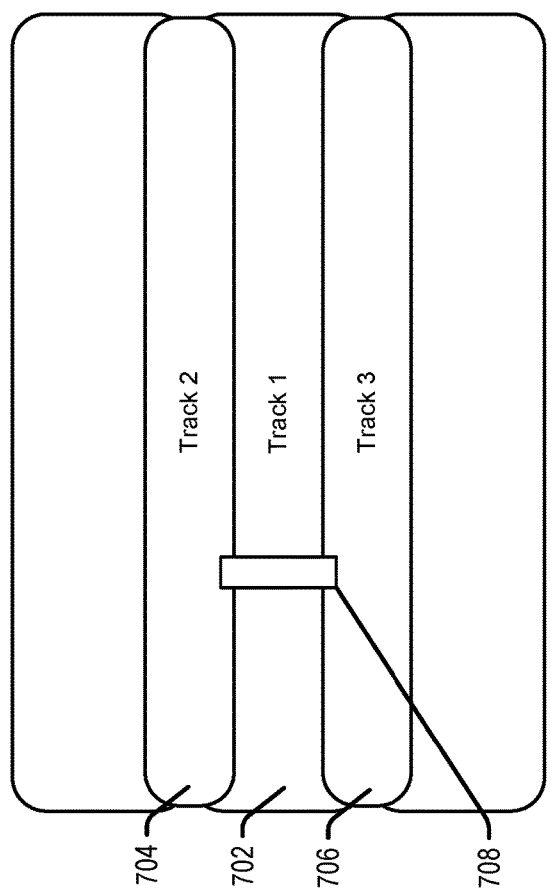
FIG. 7 is a diagram illustrating asynchronous adjacent track interference cancellation, in accordance with certain embodiments of the present disclosure.

FIGS. 5-7 illustrate example environments in which asynchronous interference cancellation may be implemented. In particular, FIGS. 5-7 illustrate an interleaved magnetic recording (IMR) hard drive system with different channel bit densities (CBD) between tracks. In IMR, tracks may be written in two passes using two kinds of writers or writer settings whose primary distinction is the writer width. In the first pass, a wide writer or write setting may be used to write tracks, which can be assumed to be even-numbered. These tracks may be written at a high CBD, for example, because the wide writer or write setting produces low transition jitter noise. In the second pass, a narrow writer or write setting may be used to write the odd-numbered tracks in such a way that the odd-numbered tracks may overlap with (e.g. overwrites) the edges of even-numbered tracks as illustrated and discussed with regard to FIGS. 6 and 7. This may result in all tracks being narrow and the even tracks exhibiting low transition noise. Thus, a high average track density and CBD may be achieved.

By packing tracks close to one another, interference from adjacent tracks may arise. For example, interference can arise because the reader response may be wider than the written track due to manufacturing constraints. In addition, an even track can be written so that it encroaches on the odd track by slightly overlapping the first track (the area of the first track). If the overlap is significant enough, corrupted data value(s) may be created on the first track and the data value previously written onto the first track may no longer be discernible without interference cancellation.

The asynchronous interference cancellation techniques described above with regard to FIGS. 1-4 may alleviate the interference even though the bits on the track of interest (or main track) and adjacent tracks may not be synchronized due to the unequal data rates of the tracks.

Referring to FIG. 5, a block diagram of a system of asynchronous interference cancellation is shown and generally designated 500. The system 500 can be an example of a data storage device (DSD), and may be an example implementation of systems 100, 200 or 300. The DSD 516 can optionally connect to and be removable from a host device 514, which can be a device or system having stored data, such as a desktop computer, a laptop computer, a server, a digital video recorder, a photocopier, a telephone, a music player, other electronic devices or systems not listed, or any combination thereof. The data storage device 516 can communicate with the host device 514 via the hardware/firmware based host interface circuit 512 that may include a connector (not shown) that allows the DSD 516 to be physically connected and disconnected from the host 514.

The DSD 516 can include a system processor 502, which may be a programmable controller, and associated memory 504. The system processor 502 may be part of a system on chip (SOC). A buffer 506 may temporarily store data during read and write operations and can include a command queue. The read/write (R/W) channel 510 can encode data during write operations to, and reconstruct data during read operations from, the data storage medium 508. The data storage medium 508 is shown and described as a hard disc drive, but may be other types of medium, such as a flash medium, optical medium, or other medium, or any combination thereof.

The R/W channel 510 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 510 can combine multiple inputs and provide a single output, as described in examples herein.

The IMR ATIC 518 (interleaved magnetic recording asynchronous track interference canceller) can implement all of or at least part of the systems and functionality of systems 100, 200, and 400. In some embodiments, the IMR ATIC 518 may be a separate circuit, integrated into the R/W channel 510, included in a system on chip, firmware, software, or any combination thereof.

Referring to FIG. 6, a block diagram of a system of asynchronous interference cancellation in the context of a hard disc drive system is shown and generally designated 600. A disc 602 includes an inner diameter 604 and an outer diameter 606 between which are a number of concentric data tracks 608, illustrated by circular dashed lines.

Information may be written to and read from the data tracks 110 on the disc 602. A transducer head 614 may be mounted on an actuator assembly 610 at an end distal to an actuator axis of rotation 612. The transducer head 614 may fly in above the surface of the disc 602 during disc operation. The actuator assembly 610 may rotate during a seek operation about the actuator axis of rotation 612 positioned adjacent to the disc 602. The seek operation may position the transducer head 614 over a target data track of the data tracks.

The exploded view 624 illustrates two overlapping tracks. A first track 618 is shown with a first channel bit density. A second track 622 is shown with a second channel bit density. The region 620 shows an area where the two tracks may be overlapped in some examples.

Channel 616 can include circuits and other elements that can be utilized to cancel interference from adjacent tracks. As mentioned above, variance in the region of overlap 620 may lead to asynchronous adjacent track interference. Thus, channel 616 may implement the systems and functions described herein to compensate for asynchronous adjacent track interference.

FIG. 7 illustrates another potential source of asynchronous adjacent track interference. In particular, interference can arise when the cross-track reader response is wider than the track being read. In FIG. 7, track 1 702 and the other wide tracks may be written first. The narrow tracks, including track 2 704 and track 3 706, may then be written over the edges of the wide tracks. In the illustrated example, the read head 708 can have a read response that is wider than the tracks 702-706. As such, when reading track 1, the read head 708 may pick up interference from track 2 704 and track 3 706. The channel 616 may operate to cancel the interference from track 2 704 and track 3 706 in the manner described above regarding FIGS. 1-4.

While discussed above in the context of IMR hard drive systems, the asynchronous interference cancellation techniques described above may also be applied in other systems, such as in hard drives where tracks in adjacent regions of tracks have differing bit rates.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
      receive first underlying data corresponding to a first signal with a first rate;
      receive a second signal with a second rate corresponding to second underlying data;
      interpolate the first underlying data to generate a plurality of interpolated signals;
      determine, for the first signal, a first channel pulse response shape with the first rate;
      determine an interference component signal based on the plurality of interpolated signals and the first channel pulse response shape; and
      cancel interference in the second signal using the interference component signal to generate a cleaned signal.

2. The apparatus of claim 1, the circuit further configured to:
   receive a third signal with the second rate; and
   equalize the third signal to generate the second signal.

3. The apparatus of claim 1, further comprising a detector circuit to generate a bit sequence corresponding to the second underlying data based on the cleaned signal.

4. The apparatus of claim 1, further comprising the circuit further configured to perform the interpolation of the first underlying data to generate a plurality of interpolated signals using a plurality of respective interpolation coefficients stored in a look up table.

5. The apparatus of claim 4, further comprising the circuit further configured to select the plurality of respective interpolation coefficients stored in the look up table based on a fractional portion of a ratio of the first rate and the second rate.

6. The apparatus of claim 5 further comprising the circuit configured to:
   generate the plurality of interpolated signals using a plurality of respective finite impulse response filters using the plurality of respective interpolation coefficients as filter coefficients of the plurality of respective finite impulse response filters.

7. The apparatus of claim 6 further comprising the circuit configured to:
   generate an error signal based on the interference component signal and the second signal; and
   perform the determining, for the first signal, of the first channel pulse response shape with the first rate using least mean square (LMS) adaptation based on the error signal.

8. The apparatus of claim 4 further comprising the circuit configured to determine the interference component signal based on the first underlying data and the first channel pulse response shape at least in part by applying the first channel pulse response shape to the plurality of interpolated signals.

9. The apparatus of claim 1, further comprising the second signal corresponding to a track of interest of a hard drive media with a first channel bit density and the first signal corresponding to an adjacent track to the track of interest with a second channel bit density.

10. A system comprising:
    a cancellation circuit configured to:
       receive first underlying data corresponding to a first signal with a first rate;
       interpolate the first underlying data to generate a plurality of interpolated signals;
       determine, for the first signal, a first channel pulse response shape with the first rate; and
       determine an interference component signal based on the plurality of interpolated signals and the first channel pulse response shape; and
    an adder configured to:
       receive a second signal with a second rate corresponding to second underlying data; and
       cancel interference in the second signal using the interference component signal to generate a cleaned signal.

11. The system of claim 10 further comprising:
    an equalizer circuit configured to receive a third signal with the second rate and to equalize the third signal to generate the second signal.

12. The system of claim 11 further comprising:
    a detector circuit configured to generate a bit sequence based on the cleaned signal.

13. The system of claim 12 further comprising the cancellation circuit further comprising:
    an interpolator circuit further configured to generate the plurality of interpolated signals using a plurality of respective interpolation coefficients stored in a look up table.

14. The system of claim 13 further comprising the interpolator circuit further configured to:
    select the plurality of respective interpolation coefficients stored in the look up table based on a fractional portion of a ratio of the first rate and the second rate; and
    generate the plurality of interpolated signals using a plurality of respective finite impulse response filters using the plurality of respective interpolation coefficients as filter coefficients of the plurality of respective finite impulse response filters.

15. The system of claim 14 further comprising the cancellation circuit including:
    a second adder configured to generate an error signal based on the interference component signal and the second signal; and
    a channel pulse response shape circuit configured to perform the determining, for the first signal, of the first channel pulse response shape with the first rate using least mean square (LMS) adaptation based on the error signal.

16. The system of claim 15 further comprising the channel pulse response shape circuit further configured to:
determine the interference component signal based on the first underlying data and the first channel pulse response shape at least in part by applying the first channel pulse response shape to the plurality of interpolated signals.

17. The system of claim 10 further comprising the second signal corresponding to a track of interest of a hard drive media with a first channel bit density and the first signal corresponding to an adjacent track to the track of interest with a second channel bit density.

18. A method comprising:
receiving first underlying data corresponding to a first signal with a first rate;
interpolating, by an interpolation circuit, the first underlying data to generate a plurality of interpolated signals using a plurality of respective interpolation coefficients stored in a look up table;
determining, by a channel pulse response shape circuit, for the first signal, a first channel pulse response shape with the first rate;
determining, by the channel pulse response shape circuit, an interference component signal based on the plurality of interpolated signals and the first channel pulse response shape; and
receiving, a second signal with a second rate corresponding to second underlying data; and
canceling interference in the second signal using the interference component signal to generate a cleaned signal.

19. The method of claim 18 further comprising:
generating an error signal based on the interference component signal and the second signal;
the interpolating of the first underlying data to generate the plurality of interpolated signals being performed by:
selecting a plurality of respective interpolation coefficients stored in the look up table based on a fractional portion of a ratio of the first rate and the second rate;
generating the plurality of interpolated signals using the plurality of respective finite impulse response filters using the plurality of respective interpolation coefficients as filter coefficients of the plurality of respective finite impulse response filter; and
the determining, for the first signal, of the first channel pulse response shape with the first rate using least mean square (LMS) adaptation based on the error signal.

20. The method of claim 19 further comprising:
generating, by a detector circuit, a bit sequence corresponding to the second underlying data based on the cleaned signal.

* * * * *